United States Patent [19]

Sperry

[11] Patent Number: 5,331,998

[45] Date of Patent: Jul. 26, 1994

[54] RADIAL VALVE WITH UNLOADER ASSEMBLY FOR GAS COMPRESSOR

[76] Inventor: Lauren D. Sperry, 1112 S. 17th St., Blue Springs, Mo. 64015

[21] Appl. No.: 11,894

[22] Filed: Feb. 1, 1993

[51] Int. Cl.⁵ .................... F16K 15/06; F16K 15/18
[52] U.S. Cl. ................. 137/512.1; 137/523; 417/446; 251/176
[58] Field of Search .......... 137/512.1, 513, 601, 137/522, 523; 251/176; 417/446

[56] References Cited

U.S. PATENT DOCUMENTS

| | | | |
|---|---|---|---|
| 311,147 | 1/1885 | Richardson | 137/512.1 |
| 979,811 | 12/1910 | Wallem | 137/512.1 X |
| 1,475,826 | 11/1923 | Hoffman | 137/512.1 X |
| 2,792,964 | 5/1957 | Reese et al. | 137/523 X |
| 3,275,032 | 9/1966 | Gruller . | |
| 3,455,335 | 7/1969 | Pekarek . | |
| 3,602,247 | 8/1971 | Bunn et al. | 137/512.1 X |
| 3,777,776 | 12/1973 | Boisserand . | |
| 3,794,063 | 2/1974 | Carroll et al. . | |
| 3,917,220 | 11/1975 | Gilmore | 251/176 X |
| 3,990,475 | 11/1976 | Myers . | |
| 4,043,710 | 8/1977 | Bunn et al. . | |
| 4,445,824 | 5/1984 | Bunn et al. . | |
| 4,447,193 | 5/1984 | Bunn et al. . | |
| 4,471,809 | 9/1984 | Thomsen et al. . | |
| 4,802,621 | 2/1989 | Standke . | |
| 4,823,842 | 4/1989 | Tollusis . | |
| 4,971,115 | 11/1990 | Tinholt . | |
| 5,011,112 | 4/1991 | Glamm | 251/176 X |

*Primary Examiner*—Arnold Rosenthal
*Attorney, Agent, or Firm*—Litman, McMahon & Brown

[57] ABSTRACT

A suction valve for a gas compressor includes a cylindrical valve guide cage with plurality of rows of valve guides, each with a corresponding poppet valve slidably movable therein. Each valve guide communicates with a compressor cylinder. A concentric cylindrical valve seat chair with a like plurality of rows of valve seats surrounds the valve guide cage. Each valve seat communicates with a suction chamber. A plurality of openings extending through the guide cage are spaced between the rows of valve guides. To unload the compressor, the valve guide cage is movable relative to the valve seat chair, thus unseating the poppet valves and effectively opening the compressor cylinder to the suction chamber. A first embodiment uses a pneumatic cylinder to move the valve guide cage longitudinally while a second embodiment uses a rotary crank to move the valve guide cage rotationally.

24 Claims, 2 Drawing Sheets

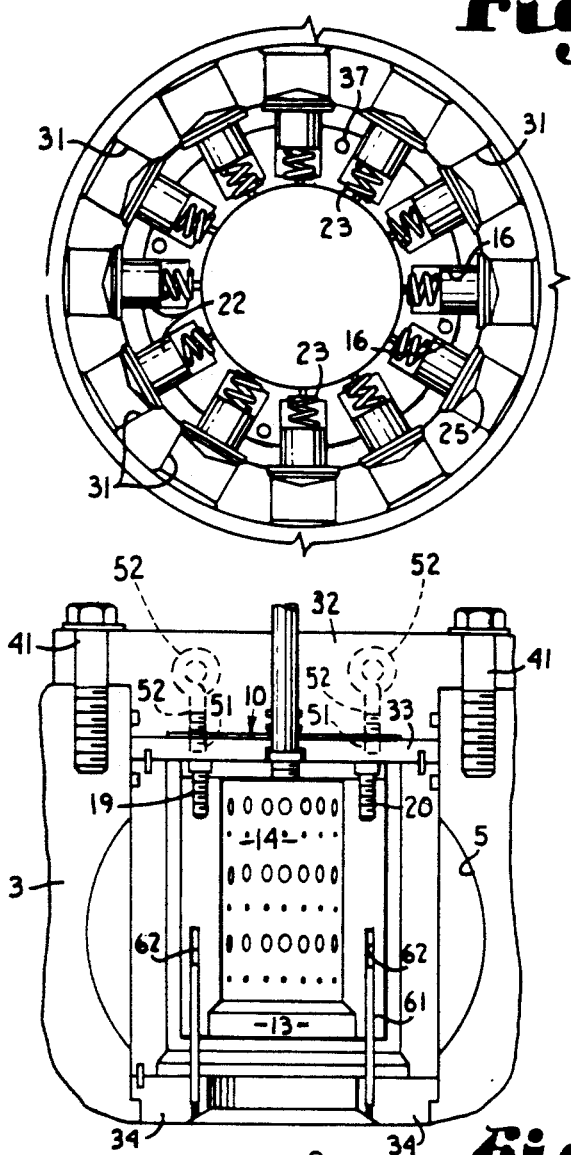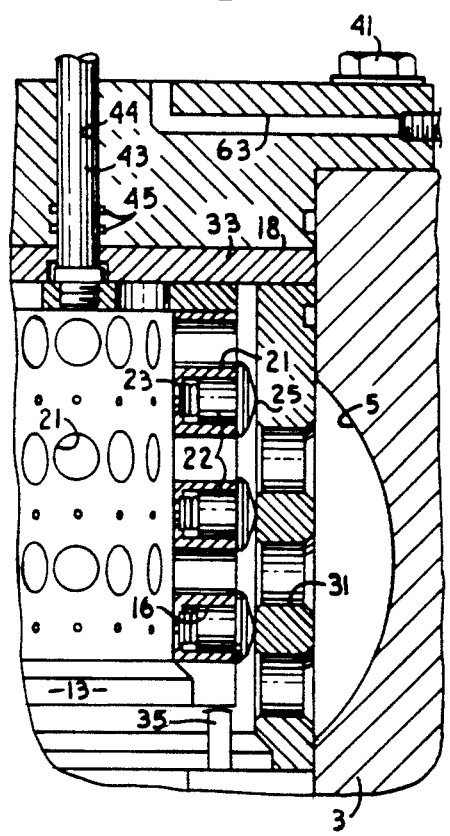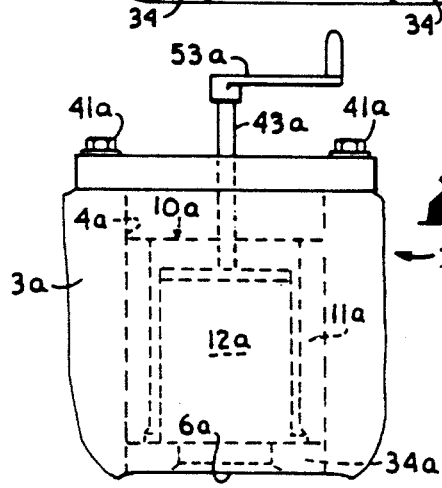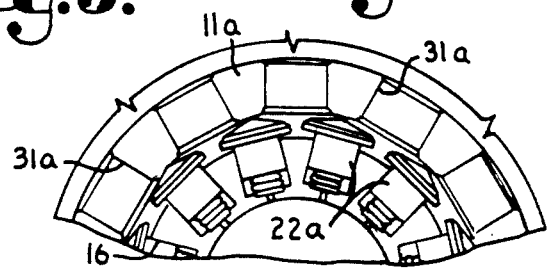

1

RADIAL VALVE WITH UNLOADER ASSEMBLY FOR GAS COMPRESSOR

BACKGROUND OF THE INVENTION

1. Field of the Invention

This invention is directed to a valve unloader assembly for a gas compressor, and more particularly to such an assembly in which a cylindrical valve guide cage or guard is movable relative to a concentrically positioned cylindrical valve seat or sleeve chair to place a plurality of poppet valves in the guide cage in an open position and therefore to unload the associated compressor.

2. Description of the Related Art

Gas compressors, such as those used in natural gas transportation pipelines and the like often use poppet valves for suction and discharge valves. In these and many other applications, poppet valves can provide reliable service as well as energy savings.

When conditions do not warrant full compression by the gas compressor, one or both ends of the compressor pistons must be "unloaded". This is usually done by bypassing the suction poppet valves so that gas is free to enter and leave the compressor cylinder from a suction chamber, thus allowing the compressor piston to idle back and forth under no load.

A number of prior art systems have been devised to selectively open or bypass similar valves in compressors or other fluid systems.

In U.S. Pat. No. 3,275,032 to Gruller, a plurality of "darts", each with an integral enlarged cam section, are selectively positionable to hold certain poppet valves open.

U.S. Pat. No. 3,455,335 to Pekarek teaches the use of a plurality of poppet valves in a fluid diverting valve, with each poppet valve having a stem which is selectively engaged by a movable actuator to open one or more of the valves.

U.S. Pat. No. 3,777,776 to Boisserand teaches a fluid distributor with a central bore surrounded by a plurality of cylindrical bores, each of which includes a sliding gate valve which is selectively operated via a pair of cam plates which move the valves within their respective bores.

U.S. Pat. No. 4,471,809 to Thomsen, et al. teaches a hydraulic control valve with a central cylinder with a number of orifices spaced thereabout and an outer, concentric cylinder with a like number of orifices. The cylinders are selectively rotatable relative to each other to align or misalign the orifices and thus open or close the valve. No poppet valves are used within the orifices.

Previous attempts to unload suction valves in gas compressors have included U.S. Pat. No. 4,043,710 to Bunn, et al., which is incorporated herein by reference, in which a compressor suction valve has a central passage therethrough. An unloading assembly includes a movable sleeve positioned within the central passage which selectively covers or uncovers ports which are positioned, when uncovered, to bypass a like number of poppet valves in the suction valve. In a similar system, U.S. Pat. No. 4,445,824 to Bunn et al. teaches a compressor suction valve clearance system in which a valve sleeve is movable relative to a tubular member within a compressor cylinder. An opening in the tubular member is selectively opened thereby to permit the compressor cylinder to communicate with a clearance pocket for unloading the compressor, or covered to allow the compressor cylinder to pressurize. Alternative manual and hydraulic operators are provided for moving the valve sleeve.

Such prior art unloading systems have utilized additional bypass openings in the compressor cylinder which must be closed for proper compressor operation. The provision of additional openings in the cylinder presents additional sealing problems. Furthermore, the slidable sleeves, although presenting a minimal surface area to the to the compressed gas within the cylinder, are still susceptible to buffeting and vibration from contact with the gas.

Accordingly, it is clear that a need exists for an improved system for unloading a suction valve in a compressor for a gas pressurization system. Such an unloading system should preferably not rely on additional bypass openings in the compressor cylinder, but, instead, should selectively hold the suction valves themselves open, thus eliminating the need for a valve bypass.

SUMMARY OF THE INVENTION

In the practice of the present invention, a gas compressor radial suction valve with an unloading assembly includes a cylindrical valve housing insertable within a compressor cylinder. The housing includes an outer valve seat or sleeve chair with a plurality of rows of poppet valve seats with each row radially arranged about the housing. Each valve seat communicates with a compressor suction chamber surrounding the suction valve. A concentric cylindrical valve guide cage or guard is positioned inside the seat chair, with a like plurality of rows of poppet valve receiving guides radially arranged in the cage. A poppet valve is slidably mounted within each valve guide in the cage, with each poppet valve normally aligned with a respective valve seat within the seat chair. Each poppet valve guide communicates through an associated opening into the gas compressor cylinder. The guide cage is attached to a shaft which extends through a bore in a valve cap which is positioned atop the valve housing. The shaft is movable in and out of the valve housing via an external unloading actuator, thus moving the attached guide cage longitudinally relative to the sleeve chair. When the guide cage is moved sufficiently so that the valve guides are misaligned with the valve seats in the seat chair, the poppet valves are vertically moved out of their seating positions, thus allowing gas to move freely into the compressor chamber on the suction stroke and out of the compressor chamber and into the suction chamber on the discharge stroke. In a second embodiment of the invention, the gas compressor can be unloaded by moving the valve guide cage rotationally relative to the valve seat chair such that the poppet valves are horizontally misaligned and unseated.

OBJECTS AND ADVANTAGES OF THE INVENTION

The principle objects and advantages of the present invention include: to provide an improved valve unloader assembly for a suction valve in a gas compressor; to provide such an assembly in which the suction valve includes a cylindrical housing with an outer cylindrical valve seat or sleeve chair; to provide such an assembly in which the seat chair includes a number of rows of poppet valve seats arranged radially about the seat chair; to provide such an assembly with a concentric cylindrical inner valve guide cage or guard which includes a like number of rows of poppet valve guides normally aligned with the valve seats with a poppet valve slidably received within each guide; to provide such an assembly in which an unloading actuator is adapted to move the guide cage relative to the seat chair such that the poppet valves are moved out of their seating positions, thus allowing gas to move freely into the compressor chamber on the suction stroke and out of the compressor chamber and into a suction chamber on the discharge stroke; and to provide such an assembly which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a cross-sectional view of the radial valve, taken along line 2—2 of FIG. 1.

FIG. 3 is an enlarged, fragmentary view, of a portion of the radial valve, showing the unloader assembly in the unloaded position.

FIG. 4 is a reduced, fragmentary sectional view of a radial valve with a valve unloader assembly, with the valve installed in a gas compressor and illustrating a pair of lifting eyelets and a pair of guide pins which serve to guide the unloader assembly.

FIG. 5 is a partially schematic, fragmentary view of a second embodiment of a radial valve with an unloader assembly, with a crank handle for operating the unloading assembly.

FIG. 6 is an enlarged, fragmentary, cross-sectional view of the radial valve of FIG. 5, taken along line 6—6 of FIG. 5, showing the unloader assembly in the unloaded position.

DETAILED DESCRIPTION OF THE INVENTION

I. Introduction and Environment

Figure 1:
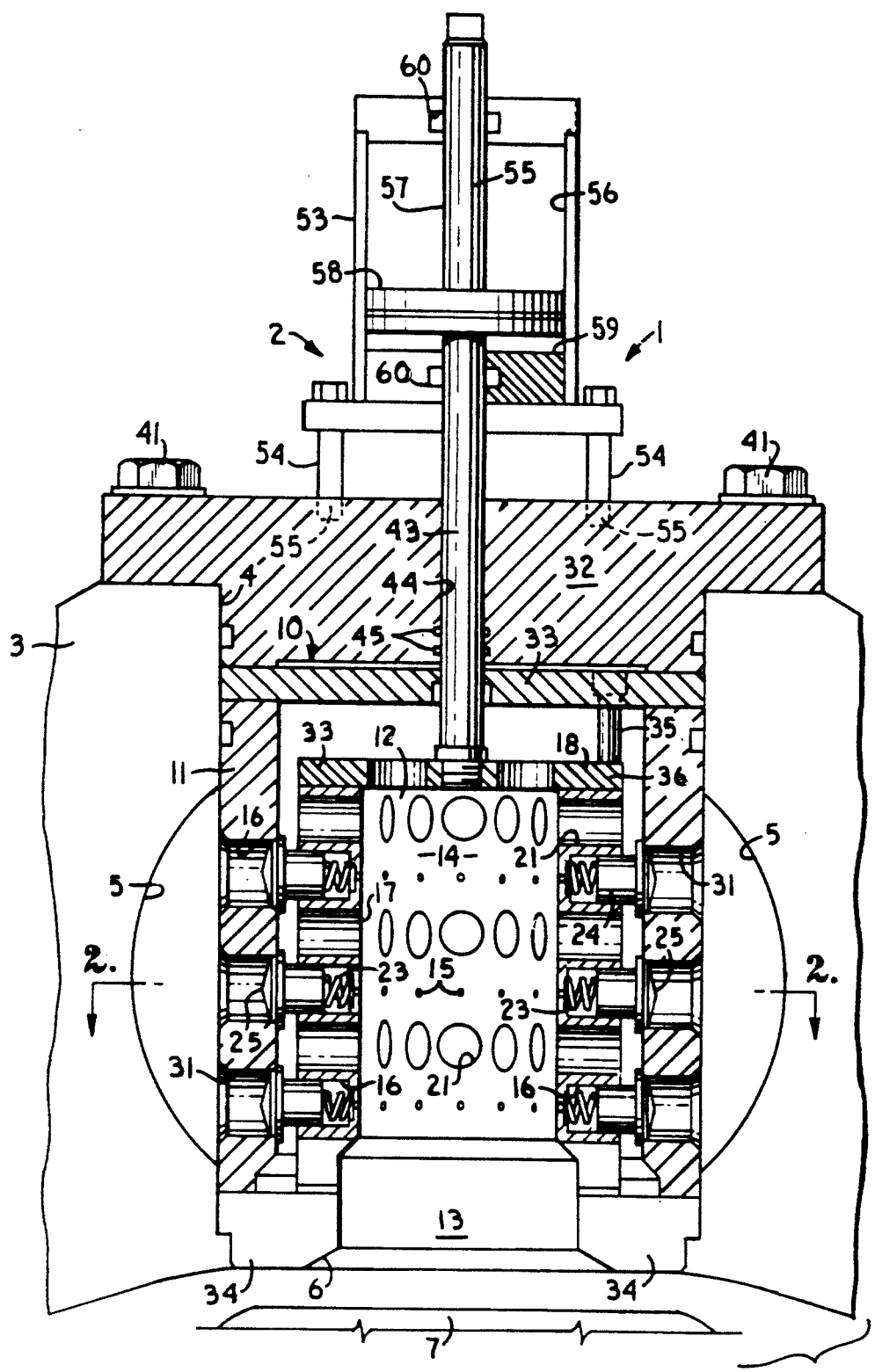
FIG. 1 is a fragmentary sectional view of a first embodiment of a radial valve with a valve unloader assembly in accordance with the present invention, with the valve installed in a gas compressor.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail the reference numeral 1 in FIGS. 1–4 generally designates a first embodiment of a suction valve with an unloader assembly 2 positioned within a compressor frame 3 including a suction valve opening 4 and a suction chamber 5 surrounding the suction valve 1. The compressor frame 3 comprises a compressor cylinder 6 communicating with the valve opening 4. A compressor piston 7 is reciprocally operable within the compressor cylinder 6.

II. Radial Poppet Valve Assembly

A radial poppet valve assembly 10 is mounted within the valve opening 4, and includes a cylindrical valve seat or sleeve chair 11 and a concentric cylindrical valve guide cage or guard 12 positioned inside of the sleeve chair 11. The valve guide cage 12 includes a flared inner section 13 opening into the cylinder 6 and an outer section 14 through which a plurality of rows of bores 15 are drilled, with each bore 15 communicating with a corresponding one of a plurality of valve guides 16 which extend through a wall 17 of the inner section 14. The valve guides 16 are arranged radially about the guide cage inner section 14.

A cage plate 18 is bolted to the top of the guide cage 12 via a plurality of threaded bolts 19 and 20 (FIG. 4). A plurality of openings 21 which extend through the valve guide cage 12 are arrayed between the rows of valve guides 16.

A plurality of poppet valves 22 are slidably received, one within each of the valve guides 16. Each poppet valve 22 includes a spring 23 connected to a valve body 24 which terminates in a flared valve head 25.

The poppet valves 22 are of the automatic lift-type which are opened by a pressure differential between the suction chamber 5 and the compressor cylinder 6. When the compressor piston 7 moves away from the suction valve 1 on its suction stroke, the gas pressure within the cylinder 6 decreases until a sufficient pressure differential exists whereby pressure within the suction chamber 5 causes the poppet valves 22 to "lift" out of corresponding seats 31 within the valve seat chair 11 and gas is communicated from the suction chamber 5 into the compressor cylinder 6. Conversely, when the piston 7 reciprocates on its discharge stroke, the poppet valves 22 are closed and the compressed gas is discharged through a discharge valve (not shown) in a conventional fashion.

The valve seat chair 11 includes a plurality of valve seats 31, each of which extends through the seat chair 11 and communicates with the suction chamber 5. The valve seats 31 are also arranged radially about the valve seat chair 11, and each valve seat 31 corresponds to one of the valve guides 16.

The valve 1 also includes a valve cap 32, a seat plate 33, and a base plate or scatter shield 34, with the seat plate 32 connected to the base plate 34 via a plurality of threaded through bolts 35. Each of the through bolts 35 extend through a corresponding bore 36 in the cage plate 18 and a bore 37 extending longitudinally through the guide cage 12. The bores 36 and 37 are sized such that the guide cage 12 and the guide cap 18 are freely movable along the bolts 35. The valve cap 32 is connected to the cylinder housing 3 via a plurality of threaded bolts 41, which extend through a corresponding plurality of bores 42 in the valve cap 32.

III. Unloading Assembly

The unloading assembly 2 includes a shaft 43 which extends through a bore 44 in the valve cap 32. The shaft 43 is movable within the bore 44 and a pair of annular elastomeric O rings 45 create a fluid-tight seal around the shaft 43. The shaft 43 is threadably attached at one end to the cage plate 33.

During assembly of the valve 1 to the compressor 3, referring to FIG. 4, a pair of lifting eyelets 52 (shown in phantom lines) are threaded into a pair of threaded bores 51 in the cage plate 33. The eyelets 52 for used for supporting the valve assembly 10 as it is placed into position in the valve opening 4 within the compressor cylinder 6 or, alternatively, when it is removed. Once the valve assembly 10 is seated in the valve opening 4, the eyelets 52 are removed from the bores 51 and the valve cap 32 is bolted onto the compressor 3 via the bolts 41.

A pneumatic unloader actuator 53 is threadably inserted into the valve cap 32 via a plurality of bolts 54 threaded into a like plurality of threaded bores 55. The actuator 53 comprises a pneumatic cylinder 56 which can be pressurized to exert a downward force on a piston rod 57 via a connected horizontal piston plate 58. The piston plate 58 is connected to the upper end of the shaft 43. The resulting downward pressure on the shaft 43 causes the attached valve guide cage 12 to be lowered to the position shown in FIG. 1, in which the piston plate 58 contacts a bottom surface 59 of the pneumatic actuator cylinder 56, whereupon the valve guides 16 align with the valve seats 31, thus seating the poppet valves 22 and loading the compressor cylinder 6. A pair of elastomeric rings 60 provide fluid-tight seals where the piston rod 57 and the shaft 43 exit the cylinder 56.

When pressure is released from the cylinder 56, gas presure within the compresor cylinder 6 and/or the suction chamber 5 pushes the shaft 43 upward through the valve cap 32, thus pulling the valve seat cage 12 upward into the position shown in FIG. 3. In this position, the valve guides 16 are misaligned with the valve seats 31, and the poppet valves 22 are thus unseated from the valve seats 31. In this position, gas within the suction chamber 5 is free to enter and leave the compressor cylinder 6 via the valve seats 31 and the openings 17 through the valve guide cage 12, thus unloading the compressor cylinder 6. A pair of guide pins 61 extend from the base plate 34 through a corresponding pair of guide pin channels 62 machined in the guide cage 12. The pins 61 and channels 62 are machined to a tolerance of thousandths of an inch to provide positive guidance for the guide cage 12 as it is raised and lowered by the actuator 53. An air vent passage bore 63 can be provided in the valve cap 32 for allowing the free flow of ambient air into and out of the pneumatic actuator 53 below the piston plate 58 to permit the piston rod 57 and plate 58 to freely operate. This also allows the release of any gas which may have gotten past the O ring seal 45.

Referring to FIGS. 5 and 6, the reference numeral 1a generally represents a second embodiment of the suction valve with unloader assembly, illustrated schematically in FIG. 5. Since the valve 1a is otherwise substantially the same as the valve 1 of FIG. 1, similar parts appearing in both FIGS. 1–4 and FIGS. 5 and 6 are represented by the same corresponding reference numeral except for the addition of a suffix "a" to the numerals of the second embodiment.

In the suction valve 1a, a rotary crank 53a is attached to the top end of the shaft 43a. The compressor cylinder 6a is unloaded by turning the crank 53a, thus turning the attached shaft 43a and the valve guide cage 12a. As shown in FIG. 6, this rotary motion of the cage 12a causes the poppet valves 22a to be misaligned horizontally between adjacent ones of the valve seats 31a, thus unseating the poppet valves 22a and unloading the compressor cylinder 6a.

With the unloader assemblies 10 and 10a of FIGS. 1 and 5 in the unload positions illustrated in FIGS. 3 and 6, respectively, the gas compressor piston 7 can be allowed to continue to run at its normal speed except that a substantial amount of energy will be saved and the torque load placed upon its prime mover is reduced since the piston 7 is allowed to reciprocate with virtually no load in the unloaded compressor cylinder 6 or 6a.

While the suction valves and unloader assemblies 1 and 1a have been described as being used in a gas compressor for a natural gas pipeline, the disclosure should not be considered so limiting. The disclosed valves 1 and 1a can also be used in a refrigeration or heating system or any other applicable fluid compression application. Furthermore, a similar unloading assembly could be used with a discharge valve simply by reversing the arrangement of the valve guide cage and the valve seat chair. In addition, while the preferred embodiment has been illustrated and described as cylindrical in shape, any other desired shape can be used, including rectangular, square, circular with one valve row, etc. so long as the guide cage and the seat chair were free to move relative to each other.

A similar unloading technique can be used with a standard double deck valve, such as that taught by Bunn, et al. U.S. Pat. No. 4,043,710, by rotating the valve cages relative to the valve seat. The technique can also be applied to a ring style valve, in which a seat chair includes one or more rows of radially arranged slots or holes, with each such row sealed by a circular ring seal positioned in a piston-like cage. The piston-like cage can be moved relative to the seat chair, thus unseating the ring seals and unloading the valve.

It is to be understood that while certain forms of the present invention have been illustrated and described herein, it is not to be limited to the specific forms or arrangement of parts described and shown.

What is claimed and desired to be secured by Letters Patent is as follows;

1. In a valve apparatus comprising a valve seat means including at least one valve seat and a valve guide cage comprising at least one valve means normally aligned with said valve seat in alternative closed and open positions, an unloader comprising;
    (a) actuator means for moving said guide cage and said valve seat means relative to each other to an unloaded position in which said valve means and said valve seat are misaligned and said valve is unloaded.

2. A valve apparatus as in claim 1, wherein;
    (a) said valve seat means comprises a plurality of valve seats;
    (b) said valve guide cage comprises a like plurality of corresponding valve guides, each of which contains a valve means, each valve guide being normally aligned with a respective one of said valve seats when said valve means are in said closed or said open positions; and (c) said actuator means includes means for moving a plurality of said valve guides to said unloaded position in which said plurality of valve guides are misaligned with their respective valve seats and the corresponding valve means are unseated.

3. A valve apparatus as in claim 2, wherein;
(a) said valve means each comprise a poppet valve.

4. In a valve apparatus for use in a gas compressor said valve having a first side and a second side; said valve apparatus further comprising;
(a) a valve seat chair including at least one valve seat communicating between said first and second sides of said valve;
(b) a valve guide cage including at least one valve guide, said valve guide being normally aligned with said valve seat;
(c) at least one valve means positioned in said at least one valve guide, said valve means being movable between an open position and a closed position while said valve guide is aligned with said valve seat, said valve means being adapted to seat in a corresponding one of said valve seats in said valve seat chair in said closed position; and
(d) actuator means for moving said guide cage and said valve seat chair relative to each other to an unloaded position for said valve apparatus in which said valve guide and said valve seat are misaligned.

5. A valve apparatus as in claim 4, wherein;
(a) said valve apparatus is a suction valve;
(b) said valve seat chair and said valve guide cage are cylindrical;
(c) said valve guide cage is concentrically positioned inside of said valve seat chair; and
(d) said valve apparatus comprises a plurality of said valve means, each said valve means being positioned in a corresponding one of said valve guides, and each of said valve guides is normally aligned with a respective one of said valve seats when the corresponding valve means is in said open or said closed position and is misaligned with a respective one of said valve seats when said valve apparatus is in said unloaded position.

6. A suction valve as in claim 5, wherein;
(a) said actuator means moves said valve guide cage along the longitudinal axis of said cylinders.

7. A suction valve as in claim 6, wherein;
(a) said unloading position unseats said valves.

8. A suction valve as in claim 7, wherein;
(a) each said valve means comprises a poppet valve.

9. A suction valve as in claim 8, wherein;
(a) there are a plurality of rows of said valve seats and a like plurality of rows of said valve guides with corresponding poppet valves, with the rows of valve seats arranged radially about said valve seat chair and the rows of valve guides arranged radially about said valve guide cage.

10. A suction valve as in claim 9, wherein;
(a) said actuator means comprises a pneumatic cylinder attached to one end of a shaft, with the other end of said shaft connected to said valve guide cage.

11. A suction valve as in claim 10, wherein;
(a) said valve guide cage includes a number of openings extending therethrough, said openings being spaced between the rows of valve guides.

12. A suction valve as in claim 5, wherein;
(a) said actuator means moves said valve guide cage rotationally about the longitudinal axis of said compressor cylinder.

13. A suction valve as in claim 12, wherein;
(a) said relative movement between said guide cage and said valve seat chair unseats said valve means to unload said compressor.

14. A suction valve as in claim 13, wherein;
(a) said valve means comprise poppet valves.

15. A suction valve as in claim 14, wherein;
(a) there are a plurality of rows of said valve seats and a like plurality of rows of said valve guides with corresponding poppet valves, with the rows of valve seats arranged radially about said valve seat chair and the rows of valve guides arranged radially about said valve guide cage.

16. A suction valve as in claim 15, wherein;
(a) said actuator means comprises a rotary crank attached to one end of a shaft, with the other end of said shaft connected to said valve guide cage.

17. A suction valve as in claim 16, wherein;
(a) said rotary crank is manually operated.

18. A suction valve as in claim 16, wherein;
(a) said valve guide cage includes a number of openings therethrough, said openings being spaced between the rows of valve guides.

19. In a suction valve for a gas compressor; said compressor having a compressor cylinder, a reciprocating piston slidably disposed therein, a suction chamber; said suction valve having an inlet side communicating with said suction chamber and an outlet side communicating with said compressor cylinder; said suction valve further comprising;
(a) a cylindrical valve seat chair including a plurality of rows of valve seats arranged radially about said seat chair, with each said valve seat communicating with said suction chamber;
(b) a cylindrical valve guide cage including a like plurality of rows of valve guides arranged radially about said guide cage, with each said valve guide communicating with said compressor cylinder, said guide cage being concentrically positioned inside of said valve seat chair and said guide cage including a plurality of openings extending therethrough, said openings being spaced between the rows of valve guides;
(c) a poppet valve positioned in each said valve guide, each said poppet valve being adapted to seat in a corresponding valve seat in said valve seat chair; and
(d) actuator means for moving said guide cage relative to said valve seat chair to unseat said poppet valves and unload said compressor.

20. A suction valve as in claim 19, wherein;
(a) said actuator means moves said valve guide cage along the longitudinal axis of said cylinders.

21. A suction valve as in claim 20, wherein;
(a) said actuator means comprises a pneumatic cylinder attached to one end of a shaft, with the other end of said shaft connected to said valve guide cage.

22. A suction valve as in claim 19, wherein;
(a) said actuator means moves said valve guide cage rotationally about the longitudinal axis of said compressor cylinder.

23. A suction valve as in claim 23, wherein;
(a) said actuator means comprises a rotary crank attached to one end of a shaft, with the other end of said shaft connected to said valve guide cage.

24. A suction valve as in claim 23, wherein;
(a) said rotary crank is manually operated.

* * * * *